United States Patent [19]
Watanabe et al.

[11] Patent Number: 5,688,043
[45] Date of Patent: Nov. 18, 1997

[54] VEHICULAR LAMP HAVING REDUCED REGENERATIVE ACTION IN OUTER PORTION OF LENS

[75] Inventors: Saburo Watanabe; Takaaki Nishizawa, both of Shizuoka, Japan

[73] Assignee: Koito Manufacturing Co., Ltd., Tokyo, Japan

[21] Appl. No.: 687,912

[22] Filed: Jul. 29, 1996

[30] Foreign Application Priority Data

Jul. 31, 1995 [JP] Japan .................... 7-214033

[51] Int. Cl.⁶ .................................................. F21V 7/00
[52] U.S. Cl. ........................ 362/297; 362/304; 362/307
[58] Field of Search .................. 362/61, 297, 304, 362/307

[56] References Cited

U.S. PATENT DOCUMENTS

| | | | |
|---|---|---|---|
| 4,831,502 | 5/1989 | Fujino et al. | 362/297 |
| 5,418,695 | 5/1995 | Yoshida | 362/61 |
| 5,607,219 | 3/1997 | Brummel et al. | 362/307 |

FOREIGN PATENT DOCUMENTS

| | | |
|---|---|---|
| 2 138 930 | 10/1984 | United Kingdom . |
| 2 270 374 | 3/1994 | United Kingdom . |
| 2 279 451 | 4/1995 | United Kingdom . |

*Primary Examiner*—Carroll B. Dority
*Attorney, Agent, or Firm*—Sughrue,Mion,Zinn,Macpeak & Seas, PLLC

[57] ABSTRACT

A fog lamp or the like having a lens disposed in front of a reflector and having portions inclined right and left, which lamp makes effective use of light reflected from the reflector and also has reduced regenerative action in an outer end portion of the lens. The reflector has a left reflecting surface area and a right reflecting surface area with a perpendicular surface containing the optical axis of the reflector as the boundary thereof. The left reflecting surface area is formed as a paraboloid of revolution, while the right reflecting surface area is formed as a laterally diffusing curved surface which reflects incident light from the light source in such a manner that the more distant a reflecting point is from the optical axis in the lateral direction, the larger a reflection angle is with respect to the optical axis.

8 Claims, 5 Drawing Sheets ced from Japanese Patent Publication No. Hei.
VEHICULAR LAMP HAVING REDUCED REGENERATIVE ACTION IN OUTER PORTION OF LENS

BACKGROUND OF THE INVENTION

The present invention relates to a lamp for use on a vehicle such as an automobile or the like. More particularly, the invention relates to the structure of a reflector and lens employed in such a lamp.

In recent years vehicular lamps have been constructed such that the outer surface thereof is flush with the adjacent surface portions of the body of the vehicle. In a front light such as a headlamp, fog lamp or the like, a lens employed therein is often has portions inclined to the right and left so that the surface of the lens conforms to the design lines of the vehicle body. (See Japanese Patent Publication No. Hei. 3-222201, for example.)

However, in the conventional lamp having lens with portions inclined to the right and left, since the lens, in particular, the outer end portion of the lens in the widthwise direction of the vehicle, and the reflector disposed at the rear of the lens are positioned very near to each other, there arises a problem as follows. The surface of the reflector is generally formed in the shape of a paraboloid of revolution, and thus the reflected light from such surface provides a substantially parallel light beam. This outer end portion of the lens can readily be heated to a high temperature due to the radiant heat of such reflected light. Thus, if the lens is formed of resin or the like, this outer end portion of the lens can be deformed due to such heating.

On the other hand, if the reflecting surface of the reflector is formed as a curved surface which reflects light from the light source in such a manner that the more distant in the lateral direction the reflecting point is from the optical axis of the reflector, the larger the deflection angle is with respect to the optical axis, the reflected light can be radiated at a proper horizontal diffusion angle, which in turn makes it possible to reduce regenerative action in the outer end portion of the lens in the widthwise direction of the vehicle due to the reflected light. (A typical example of such an arrangement is disclosed in Japanese Patent Publication No. Sho. 59-53641. Such a curved surface is hereinafter referred to as a laterally diffusing curved surface.)

However, if the entire reflecting surface of the reflector is formed as a single piece of laterally diffusing curved surface, there arises another problem. That is, when the reflecting surface of the reflector is a laterally diffusing curved surface, the usable solid angle of the reflector is smaller than in the case where the reflecting surface is formed as a paraboloid of revolution, which is disadvantageous in the illuminating function of the lamp. Also, since the lens is inclined to the right and left, it often is unavoidable that portions of the light reflected on the inner side of the reflector and radiated forward diagonally are cut off by the side wall portion of the reflector or by the side wall portion of the lamp body. This also results in a disturbance of the illuminating function of the lamp.

Generally, there has been a recent tendency for vehicle body lines to be rounded as a whole due to aerodynamic requirements and the like. For this reason, when designing the surface of the lamp to be flush with the surface of the vehicle body, not only must the lens be arranged such that it has portions respectively inclined to the right and left, but also it is often necessary to construct the lamp in such a manner that the angle of vertical inclination in the outer end portion of the lens is greater than in the inner end portion thereof.

In other words, as illustrated in FIG. 6, if the angle of vertical inclination of the lens increases, even when the reflected light from the reflector passes horizontally through horizontally diffusing lens steps formed in the lens, the transmitted diffused light does not provide a horizontally spread light distribution pattern but, as shown by two-dot chain lines in FIG. 6, when the lens is inclined downward (that is, the upper portion of the lens is situated in front of the lower portion thereof), a U-shaped light distribution pattern with the right-and-left (lateral) ends thereof curved and shifted upwardly. On the other hand, as shown by broken lines, when the lens is inclined upward (that is, the upper portion of the lens is situated to the rear of the lower portion thereof), an inverted-U-shaped light distribution pattern is produced with the right-and-left ends thereof curved and shifted downwardly. As a result of this, it is difficult to control the light distribution by means of the lens steps.

SUMMARY OF THE INVENTION

It is an object of the present invention to eliminate the drawbacks found in the above-described conventional vehicular lamp. Accordingly, it is an object of the invention to provide a lamp for vehicular use having a lens disposed in front of a reflector and which has portions inclined to the right and left, which makes effective use of the reflected light from the reflector, and wherein regenerative action in the outer end portion of the lens in the widthwise direction of the vehicle due to the reflected light is suppressed.

To attain the above and other objects, according to a first embodiment of the invention, there is provided a lamp for vehicular use in which a reflector includes a reflecting surface composed of a pair of right-and-left reflecting surface areas respectively situated on the right-and-left sides of the optical axis of the reflector in the widthwise direction of the vehicle, wherein the right-and-left reflecting surface areas are formed as mutually different surfaces in accordance with the right-and-left inclined arrangement of the lens.

Specifically, the present invention provides an improved lamp for vehicular use which comprises a light source, a reflector having an optical axis extending in the longitudinal direction of the vehicle for reflecting light from the light source forwardly, and a lens disposed in front of the reflector and having respective portions inclined right and left in such a manner that the outer end portion of the lens in the widthwise direction of the vehicle is situated rearward of the inner end portion thereof.

In particular, according to the invention, of a pair of right-and-left reflecting surface areas of the reflector respectively situated on the right-and-left sides of the optical axis, the reflecting surface area situated on the inner side in the widthwise direction of the vehicle has the shape of a paraboloid of revolution, while the other reflecting surface area has the shape of a laterally diffusing curved surface.

Also, according to a second embodiment of the invention, each of a pair of right-and-left reflecting surface areas of the reflector respectively situated on the right-and-left sides of the optical axis is composed of a laterally diffusing curved surface, wherein the ratio of the horizontal distance between the optical axis and a reflecting point to the reflection angle at this reflecting point is set to a value which is larger in the reflecting surface area on the outer side in the widthwise direction of the vehicle than the reflecting surface area on the inner side in the widthwise direction of the vehicle.

Referring to the above-mentioned laterally diffusing curved surface, the value of the reflection angle thereof and the rate of variation thereof are not specifically limited, provided the laterally diffusing curved surface is a curved surface which is formed so as to be able to reflect light in such a manner that the more distant a reflecting point is from the optical axis of the reflector in the lateral direction, the larger the reflection angle is with respect to the optical axis.

Due to the fact that the reflecting surface area on the inner side of the reflector has the shape of a paraboloid of revolution while the reflecting surface area on the outer side thereof is composed of a laterally diffusing curved surface, the following effects are obtained.

Since the reflecting surface area on the inner side of the reflector has the shape of a paraboloid of revolution, a large usable solid angle is obtained. Also, as light reflected from this reflecting surface area is radiated forwardly in the form of a substantially parallel light beam, even though the side wall portions of the reflector are formed corresponding to the right-and-left inclined portions of the lens, the reflected light is prevented from entering the side wall portions of the reflector where the luminous flux is lost, thereby enhancing the illuminating efficiency of the lamp. On the other hand, since the reflecting surface area on the outer side is composed of a laterally diffusing curved surface, light reflected from this area is radiated in such a manner that it is diffused laterally on one side, thereby reducing regenerative action in the outer end portion of the lens due to the reflected light.

When a lamp is constructed in such a manner that a lens is disposed in front of a reflector and has portions inclined right and left, a rather deep reflecting surface area can be provided on the inner side of the reflector, whereas only a rather shallow reflecting surface area can be provided on the outer side. According to the invention, due to the fact that the reflecting surface area on the inner side, where space is available, has the shape of a paraboloid of revolution, while the reflecting surface area on the outer side vehicle, where little space is available, is composed of a laterally diffusing curved surface which can be formed shallower than a paraboloid of revolution, lay-out restrictions on the lamp and the illuminating efficiency of the lamp can be well balanced. In particular, the reflection angle in the reflecting surface area on the outer side may be adjusted properly according to the amount of rightward or leftward inclination of the lens.

Also, according to the second embodiment of the invention, although the two reflecting surface areas of the reflector respectively situated on the right-and-left sides of the optical axis of the reflector are both formed as a laterally diffusing curved surface, the lateral deflection angle of the reflected light reflected from the reflecting surface area on the outer side is greater than that of the reflected light reflected from the reflecting surface area on the inner side, so that there can be obtained the following effects.

That is, since the reflecting surface area on the inner side in the widthwise direction of the vehicle is composed of a laterally diffusing curved surface having a relatively smaller reflection angle, it is possible to obtain a larger usable solid angle compared with a structure where the whole reflecting surface area is composed of a single laterally diffusing curved surface, although the usable solid angle is not so large as when the reflecting surface area has the shape of a paraboloid of revolution. Also, as the diffusion degree of the reflected light is relatively small, even when the side wall portions of the reflector are formed corresponding to the right-and-left inclined arrangement of the lens, the incident angle of the reflected light is held to a relatively small value, which leads to an enhanced illuminating efficiency of the lamp. On the other hand, because the reflecting surface area on the outer side in the widthwise direction of the vehicle is formed as a laterally diffusing curved surface having a comparatively large reflection angle, light reflected from this reflecting surface area is radiated on one side to a comparatively large extent, thereby reducing the regenerative action in the outer end portion of the lens due to the reflected light.

Further, according to the second embodiment of the invention, due to the fact that the reflecting surface area on the inner side where there is a relative deep space available is formed as a rather deep laterally diffusing curved surface having a small reflection angle, and the reflecting surface area on the outer side in the widthwise direction of the vehicle where there is no such deep space available is composed of a rather shallow laterally diffusing curved surface having a large reflection angle, lay-out restrictions on the lamp and the illuminating efficiency of the lamp can be well balanced. In particular, the values of the reflection angles of the respective reflecting surface areas, or the ratio of the reflection angles between the two reflecting surface areas, may be adjusted properly according to the amount of rightward or leftward inclination of the various portions of the lens.

As described above, according to the present invention, in a vehicular lamp constructed such that the lens thereof is disposed in front of the reflector and is inclined right and left, while making effective use of the reflected light from the reflector, it is possible to reduce the regenerative action in the outer end portion of the lens due to the reflected light. Also, according to the present invention, it is possible to enhance the illuminating efficiency of the lamp in spite of certain lay-out restrictions on the lamp due to the right-and-left inclined arrangement of the lens.

Further, according to the invention, since the reflecting surface area on the outer side in the widthwise direction of the vehicle is formed as a laterally diffusing curved surface, and the light reflected from this reflecting surface area is radiated at a certain horizontal diffusion angle while being slightly diffused on one side, it is possible to reduce the horizontally diffusing load on the lens steps in outer end portion adjacent portion of the lens in which the angle of vertical inclination increases. That is, in this lens portion, it is possible to obtain a required horizontal diffusion angle even if horizontally diffusing steps are not formed; otherwise, it is possible to set the diffusion angle imparted by the horizontally diffusing steps within a small diffused angle range in which the above-mentioned U-shaped curve and shift has small or negligible influence.

DESCRIPTION OF THE PREFERRED EMBODIMENTS

Figure 1:
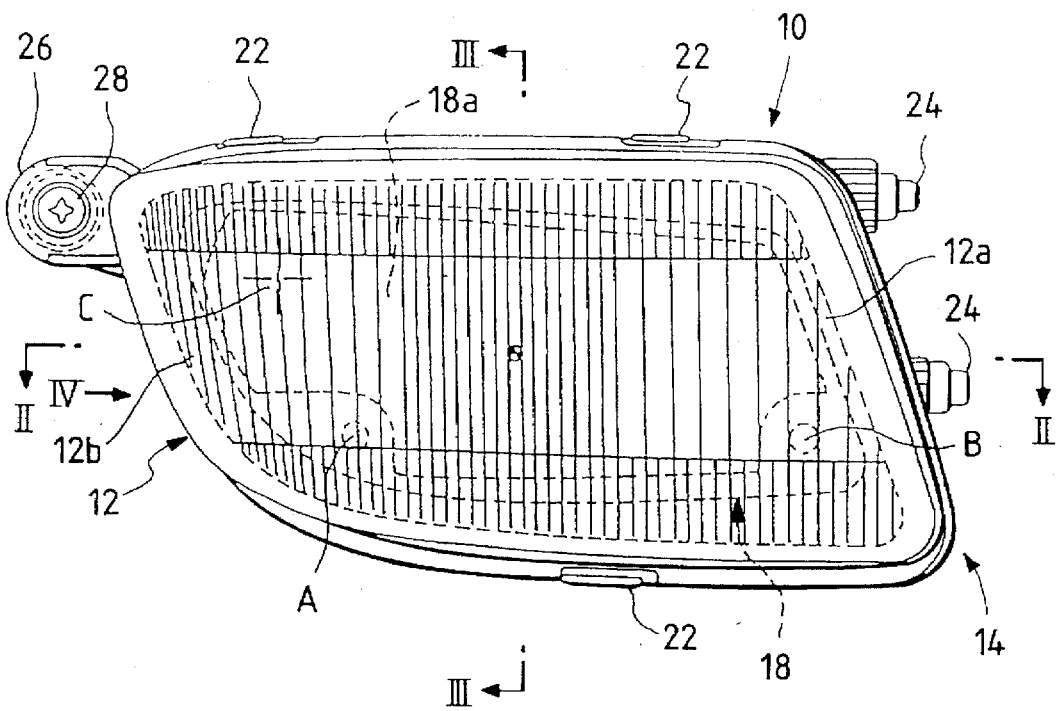
FIG. 1 is a front view of a preferred embodiment of a vehicular lamp according to the invention.
Figure 4:
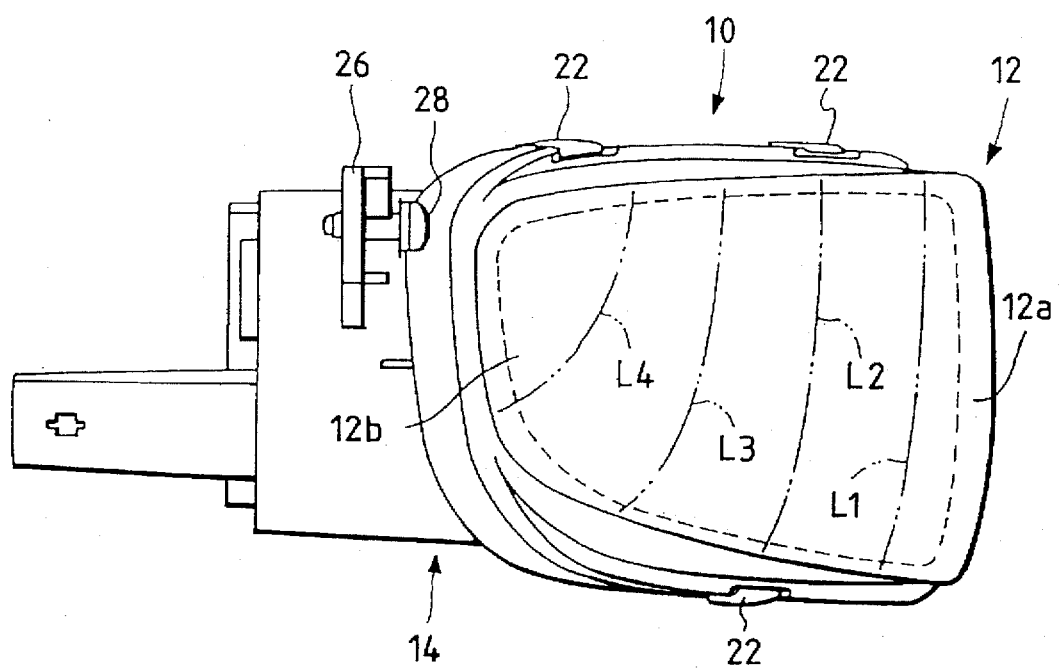
FIG. 4 is a view taken in a direction of an arrow IV shown in FIG. 1.
Figure 2:
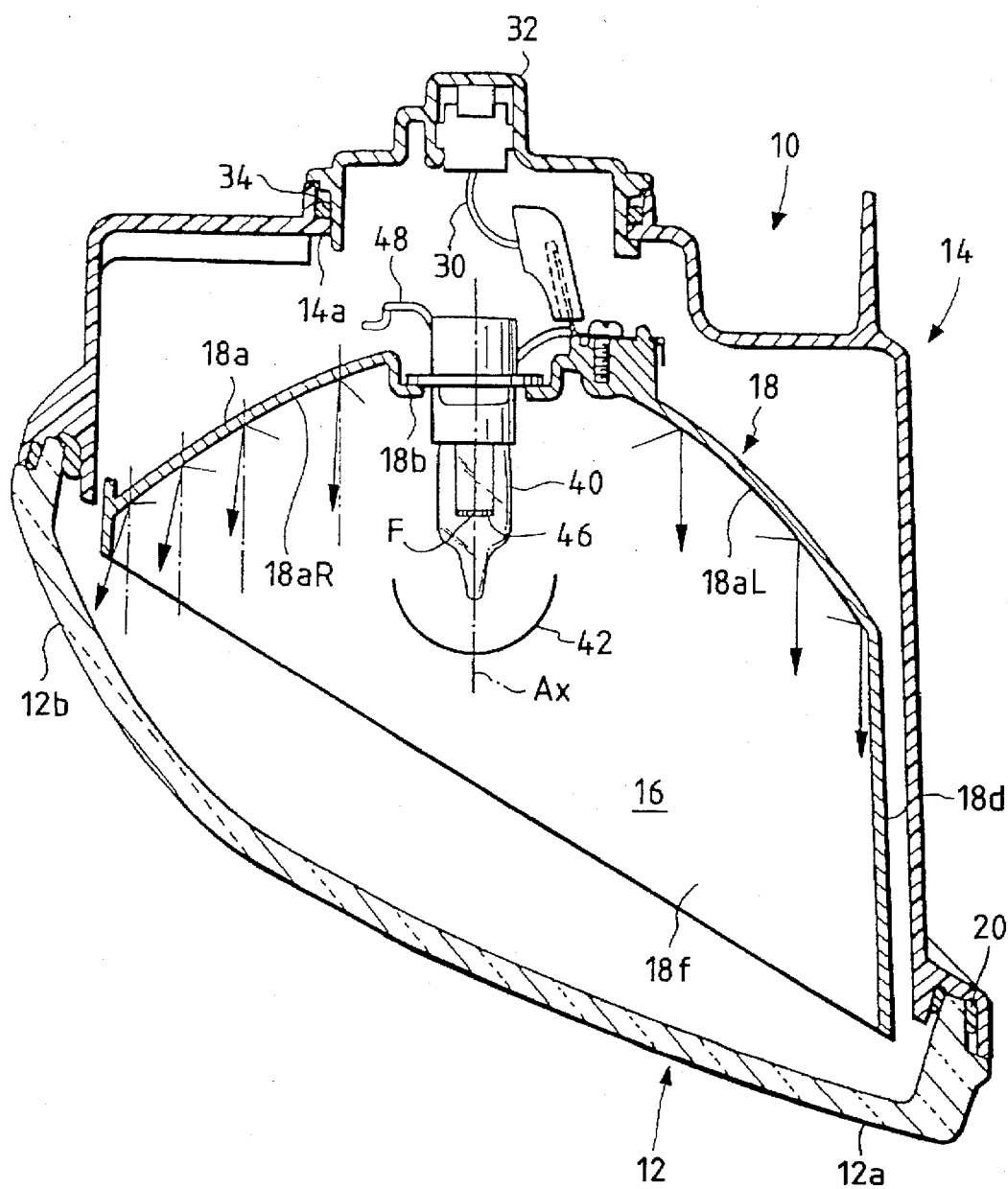
FIG. 2 is a sectional view taken along the line II—II shown in FIG. 1.
Figure 3:
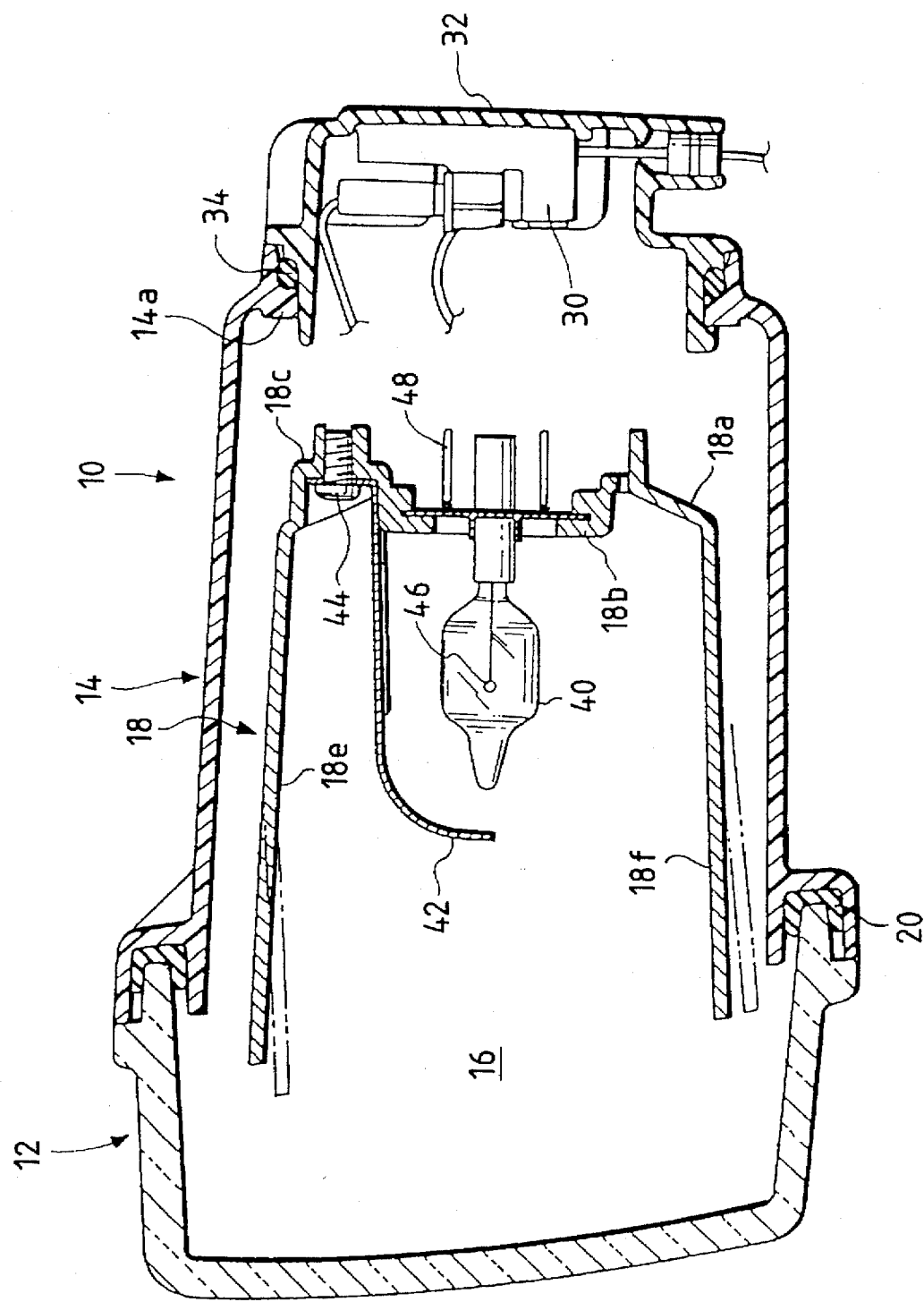
FIG. 3 is a sectional view taken along the line III—III shown in FIG. 1.

A description will be given below of preferred embodiments of a vehicular lamp constructed according to the invention with reference to FIGS. 1 to 4 of the accompanying drawings, of which FIG. 1 is a front view of a preferred embodiment of a vehicular lamp according to the invention, FIG. 2 is a sectional view taken along the line II—II shown in FIG. 1, FIG. 3 is a sectional view taken along the line III—III shown in FIG. 1, and FIG. 4 is a lateral view of the present embodiment taken in the direction of an arrow IV shown in FIG. 1.

As shown in these drawings, the lamp of the present embodiment is a fog lamp disposed on the front right side of a vehicle. A fog lamp disposed on the left side of the vehicle is bilaterally symmetrical in structure to the right-side fog lamp.

This fog lamp 10 includes an aiming mechanism of the movable reflector type whereby a reflector 18, mounted in a cavity 16 defined by a lens 12 and a body 14, can be tilted in the vertical direction. Specifically, the reflector 18 is connected to the body 14 at points A and B shown in FIG. 1 in such a manner that it can be inclined in the vertical direction. The reflector 18 is also connected to the body 14 at a point C shown in FIG. 1 in such a manner that it can also be shifted in the front-and-rear direction thereof. In this structure, by applying an external force to the reflector 18 at the point C in the front-and-rear direction, the reflector 18 can be inclined in the vertical direction about a horizontal axis which connects the points A and B with each other.

The lens 12 includes a base end portion which is bonded through a sealing agent 20 to the body 14 over the whole periphery thereof. Also, the lens 12 is mounted to the body 14 through clips 22 provided at the two upper positions and one lower position of the base end portion.

The lens surface of the lens 12, as shown in FIG. 2, has respective portions strongly inclined to right and left so that the outer end portion 12b in the widthwise direction of the vehicle (in FIG. 2, the right end portion) of the lens 12 is situated to the rear of the inner end portion 12a (in FIG. 2, the left end portion) of the lens 12. Also, the lens surface, as shown in FIG. 3, is slightly inclined in the vertical direction (downward inclination) as well such that the upper portion thereof is situated in front of the lower portion thereof. The angle of this downward inclination, as can be seen clearly also from virtual longitudinal section lines L1, L2, L3 and L4, which are drawn at a plurality of positions in the widthwise direction of the vehicle on the lens surface and are respectively shown by two-dot chain lines in FIG. 4, increases gradually from the inner end portion 12a of the lens surface toward the outer end portion 12b thereof. In the portion of the lens surface adjacent the outer end portion 12b, the downward inclination angle is of the order of 45°.

The body 14, as shown in FIG. 1, can be mounted on a vehicle body through a pair of upper and lower bosses 24 formed integrally with the inner side in the widthwise direction of the vehicle portion of the body 14 and also through a screw 28 in threaded engagement with a bracket 26 formed integrally with the outer side of the vehicle portion of the body 14. Also, as shown in FIGS. 2 and 3, a cover 32 with a harness 30 incorporated therein is mounted through an O-ring 34 in an opening 14a formed in the rear portion of the body 14 for replacement of the bulb.

The reflector 18 is formed of die cast aluminum, and, as shown in FIGS. 2 and 3, includes a reflecting surface forming portion 18a which forms the reflecting surface of the reflector 18, and a socket base portion 18b on which a bulb 40 can be mounted. The two portions 18a and 18b are formed integrally with each other. Above the socket base portion 18b, there is provided a shade mounting portion 18c used to fix a shade 42 to the reflector 18 through a screw 44. The bulb 40 is a halogen bulb of the so called C-6 type, and includes a filament coil 46 which has an axis extending in the right-and-left direction. The bulb 40 is positioned and fixed to the socket base portion 18b by means of a line spring 48.

The reflecting surface forming portion 18a includes two right-and-left areas with a perpendicular surface including the optical axis Ax of the reflector 18 as the boundary thereof, while the right-and-left areas are formed as curved surfaces which are mutually different in shape from each other. That is, the left reflecting surface area 18aL situated on the left side of the optical axis Ax has the shape of a paraboloid of revolution, whereas the right reflecting surface area 18aR situated on the right side of the optical axis Ax is composed of a laterally diffusing curved surface. This laterally diffusing curved surface, as shown in FIG. 2, is a curved surface which reflects incident light from the filament coil 46 serving as a light source in such a manner that the more distant the reflecting point is from the optical axis Ax in the lateral direction, the larger the reflection angle is with respect to the optical axis Ax. (Above-mentioned Japanese Patent Publication No. Sho. 59-53641 discloses a method for determining such a laterally diffusing curved surface by deforming a paraboloid of revolution, and thus a detailed description of such a technique is omitted here. However, it should be noted here that the degree of deformation of the paraboloid of revolution in setting the laterally diffusing curved surface is set to a value which is equivalent to the right-and-left inclination angle of the lens.)

The focal position of the paraboloid of revolution forming the left reflecting surface area 18aL and the focal position of the laterally diffusing curved surface forming the right reflecting surface area 18aR are both set at a point F on the optical axis Ax, and both of the focal distances of the paraboloid of revolution and laterally diffusing curved surface are set to the same value. The front-and-rear position of the bulb mounting seat surface in the socket base portion 18b is set in such a manner that the filament coil 46 of the bulb 40 can be positioned at the focal position F.

The reflector 18 also includes a side wall portion 18d which extends in the longitudinal direction thereof and is connected to the left side edge of the left reflecting surface area 18aL, and the reflector 18 further includes an upper wall portion 18e and a lower wall portion 18f having a front end edge inclined respectively to the right and left in correspondence with the right-and-left inclined portions of the lens 12, while the upper and lower wall portions 18e and 18f are connected to the side wall portion 18d. The reason for provision of the side wall portion 18d, upper wall portion 18e and lower wall portion 18f is to improve the appearance of the lamp by providing as much lustrous surface area as possible.

In the present embodiment, because the left reflecting surface area 18aL is formed as a paraboloid of revolution and the right reflecting surface 18aR is formed as a laterally diffusing curved surface, the following effects are obtained.

That is, since the left reflecting surface area 18aL is formed as a paraboloid of revolution, there can be secured a large usable solid angle. Also, since light reflected from such left reflecting surface area 18aL, as shown in FIG. 2, is radiated forwardly in the form of a substantially parallel light beam, the possibility of reflected light entering the side wall portion 18d of the reflector 18 is eliminated, thereby improving the illuminating function of the fog lamp 10. On the other hand, because the right reflecting surface area 18aR is formed as a laterally diffusing curved surface, light reflected from such right reflecting surface area 18aR, as shown in FIG. 2, is radiated in such a manner that it is diffused on one side (in the rightward direction), which avoids the problem of the outer end portion 12b of the lens 12 being raised up to high temperatures due to the radiant heat of the reflected light.

Further, as shown in FIG. 2, when the lens 12 is disposed in front of the reflector 18 and inclined right and left, there is a restriction on the lay-out of the lamp; that is, although the reflecting surface area of the reflector 18 situated on the inner side in the widthwise direction of the vehicle can be made rather deep, the reflecting surface area on the outer side in the widthwise direction of the vehicle must be made rather shallow. However, according to the present embodiment, because there is sufficient space available for the left reflecting surface area 18aL situated on the inner side in the widthwise direction of the vehicle to be made deep, it is formed as a paraboloid of revolution, and because the right reflecting surface area 18aR on the outer side in the widthwise direction of the vehicle, where there is no room for a deep reflector, is formed as a laterally diffusing curved surface which can be formed rather shallower than a paraboloid of revolution, the lay-out restriction on the lamp and the illuminating function of the lamp can be adjusted in good balance.

As described above, according to the present embodiment, in the fog lamp 10 in which the lens 12 is disposed in front of the reflector 18 and is inclined right and left, while making effective use of the light reflected from the reflector 18, it is possible to reduce the regenerative action in the outer end portion 12b of the lens 12 due to such reflected light. Also, in spite of the restriction on the lay-out of the lamp due to the right-and-left inclined arrangement of the lens 12, the illuminating function of the lamp can be improved.

Further, since the lens 12 employed in the present embodiment is formed such that the downward inclination angle thereof is set larger in the outer end portion 12b thereof than in the inner end portion 12a, the operational effect, which is provided by forming the right reflecting surface area 18aR on the outer side as a laterally diffusing curved surface in the above-mentioned manner, is further improved.

Figure 5:
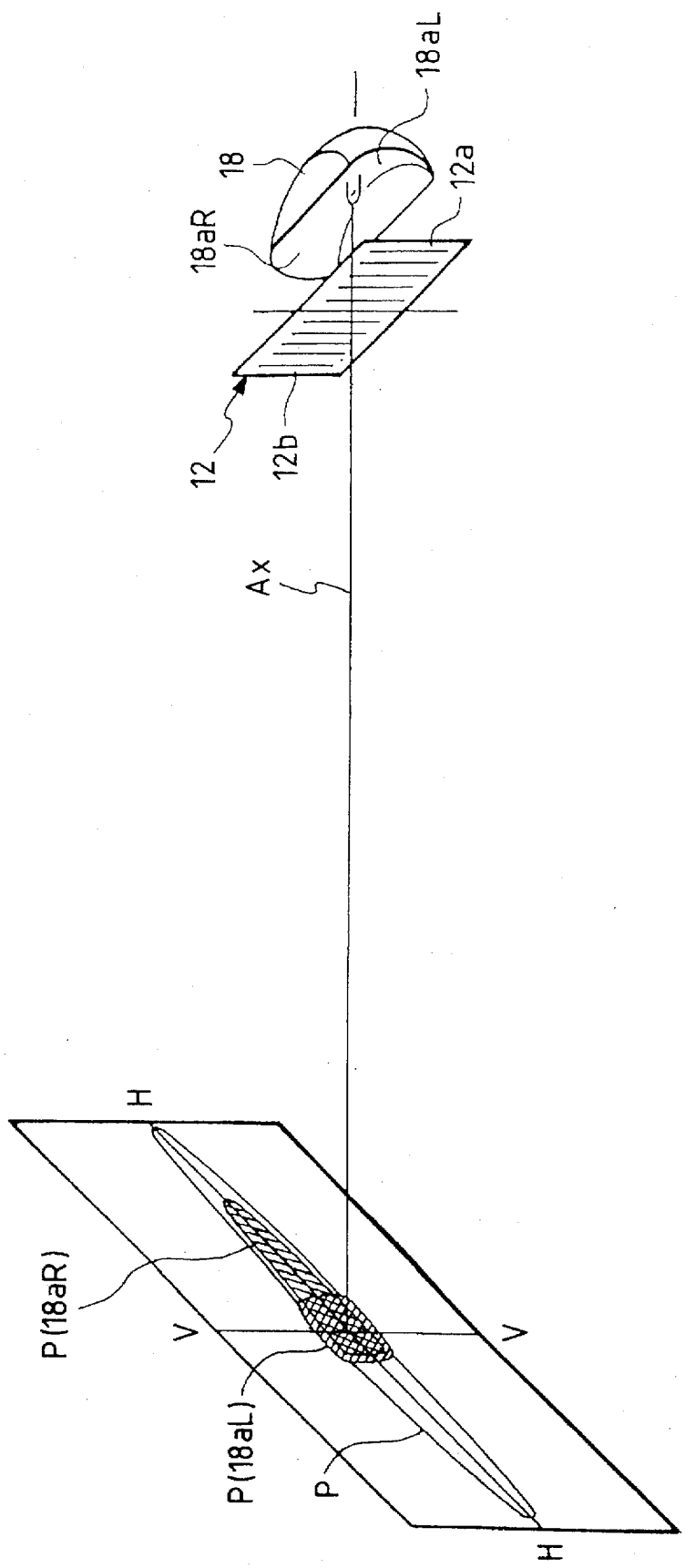
FIG. 5 is a perspective view of the above embodiment, and is used in explaining the operation thereof.

That is, as shown in FIG. 5, in a state in which the lens 12 is removed, light reflected from the left reflecting surface area 18aL formed as a paraboloid of revolution is radiated in the front direction as a substantially parallel light beam having a spot-like pattern P (18aL), whereas light reflected from the right reflecting surface area 18aR formed as a laterally diffusing curved surface is radiated from the front direction to the right direction in the form of a pattern P (18aR) which spreads out at a certain horizontally diffused angle.

Therefore, when forming the light distribution pattern P of the fog lamp with the lens 12 disposed in front of the reflector 18, even if no lens steps for obtaining a large, horizontally diffused angle are formed in the lens 12, it is possible to obtain a required right-direction diffusion angle to the front of the right reflecting surface area 18aR.

Figure 6:
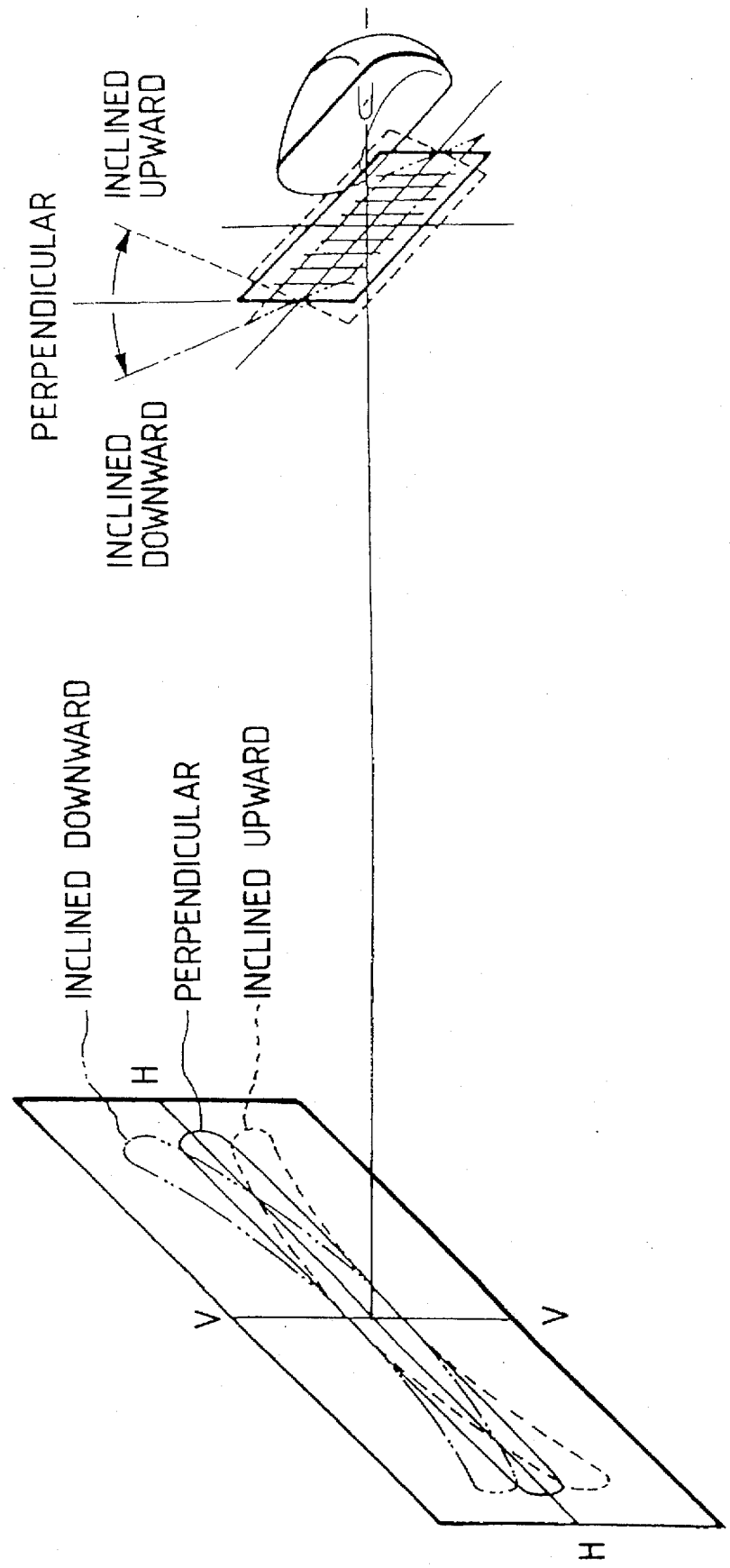
FIG. 6 is an explanatory perspective view of a lens and a reflector employed in the above embodiment, illustrating the relationship between the vertical inclination angle of the lens and the light distribution pattern curve.

In other words, generally, when right-and-left diffusing steps are formed in a downwardly inclined lens, there is produced a U-shaped light distribution pattern shown by a two-dot chained line in FIG. 6. However, according to the present embodiment, since there is no need to form horizontally diffusing steps having a large diffusing angle in the adjacent portion of the outer end portion 12b in which the downward inclination angle of the lens 12 is large, it is possible to reduce the production of the U-shaped light distribution pattern to a minimum.

For reference, in FIG. 5, for the purpose of simplified explanation, the lens 12 and reflector 18 are shown without inclination in the right-and-left or vertical directions.

In the above-described embodiment, because the focal position of the paraboloid of revolution forming the left reflecting surface area 18aL and the focal position of the laterally diffusing curved surface forming the right reflecting surface area 18aR are both set at the point F on the optical axis Ax, and also because the focal distances thereof are set to the same value, the left and right reflecting surface areas 18aL and 18aR of the reflector 18 can be smoothly connected to each other in the perpendicular surface including the optical axis Ax of the reflector 18. However, the invention is not limited to this arrangement, and alternatively the reflector 18 may be constructed such that the focal positions and focal distances of the left and right reflecting surface areas 18aL and 18aR are different from each other. However, in such a case, there is produced a difference in level in the reflector 18, that is, in the perpendicular surface including the optical axis Ax of the reflector 18.

Also, in a lamp constructed such that the right-and-left inclination angle of the lens 12 is not so large as that of the above-mentioned embodiment, alternatively, instead of the left reflecting surface area 18aL being formed as a paraboloid of revolution as in the above-mentioned embodiment, it may also be formed as a laterally diffusing curved surface similar to the right reflecting surface area 18aR but differing in that light reflected from such left reflecting surface area 18aL provides a smaller reflection angle than the right reflecting surface area 18aR. That is, in this case as well, there can be obtained a similar operational effect to the above-described embodiment, and also the reflected light can be diffused in the left direction as well by the left reflecting surface area 18aL formed as the laterally diffusing curved surface. As a result, in a lamp in which the downward inclination angle of the lens 12 is large not only in the outer side portion thereof but also in the inner side portion, the horizontal diffusion load on the lens steps can be reduced over the whole lamp, which makes it possible to reduce the production of the above-mentioned U-shaped light distribution pattern.

What is claimed is:

1. A vehicular lamp, comprising: a light source; a reflector having an optical axis extending in a longitudinal direction of vehicle on which said lamp is mounted for reflecting light from said light source forwardly; and a lens disposed in front of the reflector and having respective portions inclined right and left in such a manner that an outer end portion of the lens in a widthwise direction of a vehicle on which said lamp is mounted is situated rearward of an inner end portion of the lens in said widthwise direction of said vehicle, said reflector having a first reflecting surface area positioned on an inner side in said widthwise direction of said vehicle having the shape of a paraboloid of revolution, and a second reflecting surface area positioned on an outer side in said widthwise direction having the shape of a curved surface formed so as to reflect light from said light source in such a manner that the more distant a reflecting point on said second reflecting area is from said optical axis of said reflector in a lateral direction of said reflector, the larger a reflection angle at said reflecting point is with respect to said optical axis.

2. A vehicular lamp as set forth in claim 1, wherein a vertical inclination angle of said lens is larger in said outer end portion of said lens than in said inner end portion of said lens.

3. A vehicular lamp as set forth in claim 2, wherein said vertical inclination angle increases gradually from said inner end portion of said lens toward said outer end portion.

4. A vehicular lamp as set forth in claim 3, wherein said vertical inclination angle is about 45° in a portion of the surface of said lens adjacent said outer end portion.

5. A vehicular lamp, comprising: a light source; a reflector having an optical axis extending in a longitudinal direction of a vehicle on which said lamp is mounted for reflecting light from the light source forwardly; and a lens disposed in front of the reflector and having respective portions inclined right and left in such a manner that an outer end portion of the lens in a widthwise direction of said vehicle is situated rearward of an inner end portion of said lens in said widthwise direction of said vehicle, said reflector comprising first and second reflecting surface areas respectively situated on right and left sides of said optical axis, said first and second reflecting surface areas each being formed as a curved surface which reflects light from said light source in such a manner that the more distant a reflecting point is from said optical axis in a lateral direction, the larger a reflection angle is with respect to said optical axis, a ratio of a horizontal distance between said optical axis and said reflecting point to said reflection angle at said reflecting point being larger in a one of said first and second reflecting surface areas on an outer side in a widthwise direction of the vehicle than in a one of said first and second said reflecting surface areas on an inner side in said widthwise direction of the vehicle.

6. A vehicular lamp as set forth in claim 5, wherein a vertical inclination angle of said lens is larger in said outer end portion of said lens than in said inner end portion of said lens.

7. A vehicular lamp as set forth in claim 6, wherein said vertical inclination angle increases gradually from said inner end portion of said lens toward said outer end portion.

8. A vehicular lamp as set forth in claim 7, wherein said vertical inclination angle is about 45° in a portion of the surface of said lens adjacent said outer end portion.

* * * * *